(12) United States Patent
Ma et al.

(10) Patent No.: US 9,904,105 B2
(45) Date of Patent: Feb. 27, 2018

(54) BACKLIGHT MODULE WITH LIGHT UNIFORM DESIGN

(71) Applicant: AU OPTRONICS CORPORATION, Hsin-Chu (TW)

(72) Inventors: Chi-Tang Ma, Hsin-Chu (TW); Su-Yi Lin, Hsin-Chu (TW); Ming-Cheng Wang, Hsin-Chu (TW); Wei-Chun Chung, Hsin-Chu (TW); Chen-Hsun Yang, Hsin-Chu (TW); Jian-Li Huang, Hsin-Chu (TW); Chung-Ting Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 105 days.

(21) Appl. No.: 14/788,130

(22) Filed: Jun. 30, 2015

(65) Prior Publication Data

US 2016/0077381 A1     Mar. 17, 2016

(30) Foreign Application Priority Data

Sep. 11, 2014    (TW) .............................. 103131272 A

(51) Int. Cl.
    *G02F 1/00*          (2006.01)
    *G02F 1/1335*       (2006.01)

(52) U.S. Cl.
    CPC .. *G02F 1/133606* (2013.01); *G02F 1/133603* (2013.01); *G02F 1/133605* (2013.01); *G02F 1/133611* (2013.01); *G02F 1/133608* (2013.01)

(58) Field of Classification Search
CPC ... G02F 1/133553; G02F 2001/133613; G02F 2001/133606; G02F 2001/133603; G02F 2001/133605; G02F 2001/133611; G02F 2001/133608; G02F 1/133602–1/133611
USPC .................. 362/235, 241, 245, 97.1–97.4
See application file for complete search history.

(56) References Cited

U.S. PATENT DOCUMENTS

| | | | |
|---|---|---|---|
| 5,886,759 A | 3/1999 | Mashino | |
| 7,497,592 B2 | 3/2009 | Chou | |
| 7,762,705 B2 | 7/2010 | Sakai et al. | |
| 8,197,103 B2 | 6/2012 | Chang et al. | |

(Continued)

FOREIGN PATENT DOCUMENTS

| CN | 101430053 | 5/2009 |
|---|---|---|
| CN | 102494264 A | 6/2012 |

(Continued)

*Primary Examiner* — Sean Gramling
*Assistant Examiner* — Gerald J Sufleta, II
(74) *Attorney, Agent, or Firm* — McClure, Qualey & Rodack, LLP

(57) ABSTRACT

A backlight module including a carrier plate, a plurality of light sources, at least one low reflective portion, and a modulation film is provided. The carrier plate has a carrier surface carrying the light sources while the low reflective portion is disposed on the carrier surface between an outer light source and a side edge of the carrier plate. The reflectance of the low reflective portion is less than that of the carrier surface. The modulation film is disposed above the light sources while the low reflective portion has a projection area on the modulation film. The projection area has a lower normalized transmission ratio comparing to adjacent areas along an extending direction of the side edge of the carrier plate.

15 Claims, 11 Drawing Sheets

(56) References Cited

U.S. PATENT DOCUMENTS

| | | | |
|---|---|---|---|
| 8,643,807 B2 | 2/2014 | Lee et al. | |
| 8,646,930 B2 | 2/2014 | Shen et al. | |
| 8,665,400 B2 | 3/2014 | Hong et al. | |
| 2004/0028895 A1 | 2/2004 | Yamakami et al. | |
| 2005/0099806 A1 | 5/2005 | Tsai | |
| 2007/0165421 A1 | 7/2007 | Sakai et al. | |
| 2007/0230206 A1* | 10/2007 | Hsiao | G02F 1/133605 362/560 |
| 2010/0079980 A1 | 4/2010 | Sakai | |
| 2010/0135003 A1 | 6/2010 | Huang et al. | |
| 2010/0232165 A1 | 9/2010 | Sato et al. | |
| 2011/0044027 A1 | 2/2011 | Chen | |
| 2011/0261286 A1* | 10/2011 | Choi | G02F 1/133603 349/61 |
| 2012/0218752 A1 | 8/2012 | Sumitani | |
| 2014/0204578 A1* | 7/2014 | Kim | F21V 11/16 362/235 |
| 2014/0268806 A1 | 9/2014 | Tsai et al. | |
| 2015/0029697 A1* | 1/2015 | Park | F21V 7/00 362/97.1 |
| 2015/0293405 A1 | 10/2015 | Park et al. | |
| 2015/0309366 A1* | 10/2015 | Park | G02F 1/133605 349/58 |

FOREIGN PATENT DOCUMENTS

| | | | |
|---|---|---|---|
| CN | 102518986 | | 6/2012 |
| CN | 103383084 | | 11/2013 |
| JP | 08-240720 | | 9/1996 |
| JP | 08240720 | * | 9/1996 |
| JP | 2006108116 | | 4/2006 |
| JP | 2010108919 | | 5/2010 |
| TW | I 232337 | | 5/2005 |
| TW | M 295746 | | 8/2006 |
| TW | 200638135 | | 11/2006 |
| TW | 200730904 | | 8/2007 |
| TW | M 321111 | | 10/2007 |
| TW | I 292071 | | 1/2008 |
| TW | 200817788 | | 4/2008 |
| TW | 200835962 | | 9/2008 |
| TW | 200923516 A | | 6/2009 |
| TW | 200923516 A | | 9/2009 |
| TW | I 319429 | | 1/2010 |
| TW | 201032348 | | 9/2010 |
| TW | 201107841 A1 | | 3/2011 |
| TW | I 359308 | | 3/2012 |
| TW | M 437971 | | 9/2012 |
| WO | 2014014134 A1 | | 1/2014 |

* cited by examiner

BACKLIGHT MODULE WITH LIGHT UNIFORM DESIGN

BACKGROUND OF THE INVENTION

1. Field of the Invention

The present invention relates to a backlight module for a display device, in particular, to a backlight module with light uniform design for a display device.

2. Description of the Prior Art

In recent years, the liquid crystal display (LCD) technology is more mature. With the increase of the preferences and demands of consumers, the LCDs also gradually become thinner. In order to achieve a thinner LCD, various components of the LCD, such as display panel, optical film and backlight module, should be reduced in thickness. Because the backlight module needs a light mixing space, a required thickness for the backlight module is usually large, and thus the main target is to reduce the thickness of the backlight module.

FIG. 1A shows a thin type of direct lighting backlight module. As shown in FIG. 1A, a plurality of light-emitting diode (LED) light sources 13 are placed on the carrier plate 10. A reflective film 30 is disposed above the LED light sources 13. A plurality of holes 31 are formed in the reflective film 30. The light generated by LED light sources 13 is reflected back and forth between the reflective film 30 and the carrier plate 10 and is emitted via different holes 31 to achieve the purpose of dispersing the light source. In addition, a diffusion plate 50 is disposed above the reflective film 30. The diffusion plate 50 is supported by a plurality of support members 11, which are disposed on the carrier plate 10 and pass through the holes 31, and the light leaving from the reflective film 30 and passing through the diffusion plate 50 can produce uniform backlighting.

FIG. 1B shows a top view of the reflective film 30. As shown in FIG. 1B, the reflective film 30 includes multiple blocks 33, and the holes 31 in each block 33 are arranged with same arrangement. In the central part of the reflective film 30, since the amount of light in a position adjacent to each of the blocks 33 can be complemented by adjacent blocks 33, the uniformity of light distribution still can be maintained. However, in the edge of the reflective film 30, because of no adjacent blocks 33 to complement the amount of light, there will be a more obvious distribution with bright regions 35 and dark regions 37.

SUMMARY OF THE INVENTION

An object of the present invention is to provide a backlight module having better backlight uniformity.

Another object of the present invention is to provide a backlight module to reduce the light leakage.

A backlight module includes a carrier plate, a plurality of light sources, at least one low reflective portion, and a modulation film. The carrier plate has a carrier surface with a first reflectance for carrying the light sources. The light sources include a plurality of outer light sources distributed along a side edge of the carrier surface. The low reflective portions disposed on the carrier surface between the outer light sources and the side edge of the carrier plate. The low reflective portions have a second reflectance less than the first reflectance. The modulation film is disposed above the light sources and has a plurality of light emitting structures. The modulation film distributes the light generated by the light sources to emit through the light emitting structures at different positions. Each of the low reflective portions has a projection area on the modulation film. The projection area has a lower normalized transmission ratio comparing to adjacent areas along an extending direction of the side edge of the carrier plate.

DETAILED DESCRIPTION OF THE PREFERRED EMBODIMENT

The present invention provides a backlight module applied to a display device. In the preferred embodiment, the display device generates an image by using an LCD panel and a backlight module, but in different embodiments, the display device can display the image by using another panel with the backlight module.

Figure 1A:
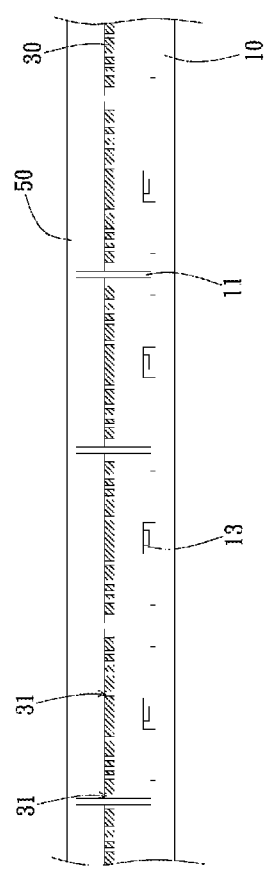
FIG. 1A schematically illustrates a traditional thin type of backlight module.
Figure 1B:
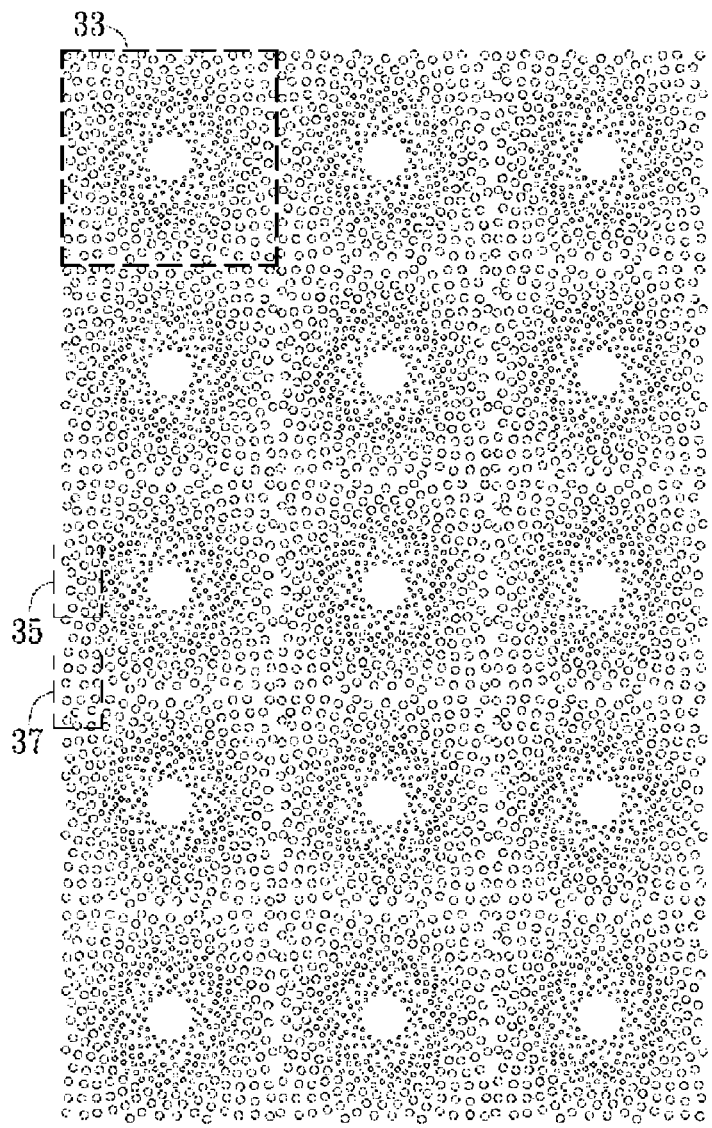
FIG. 1B schematically illustrates a traditional modulation film.
Figure 2:
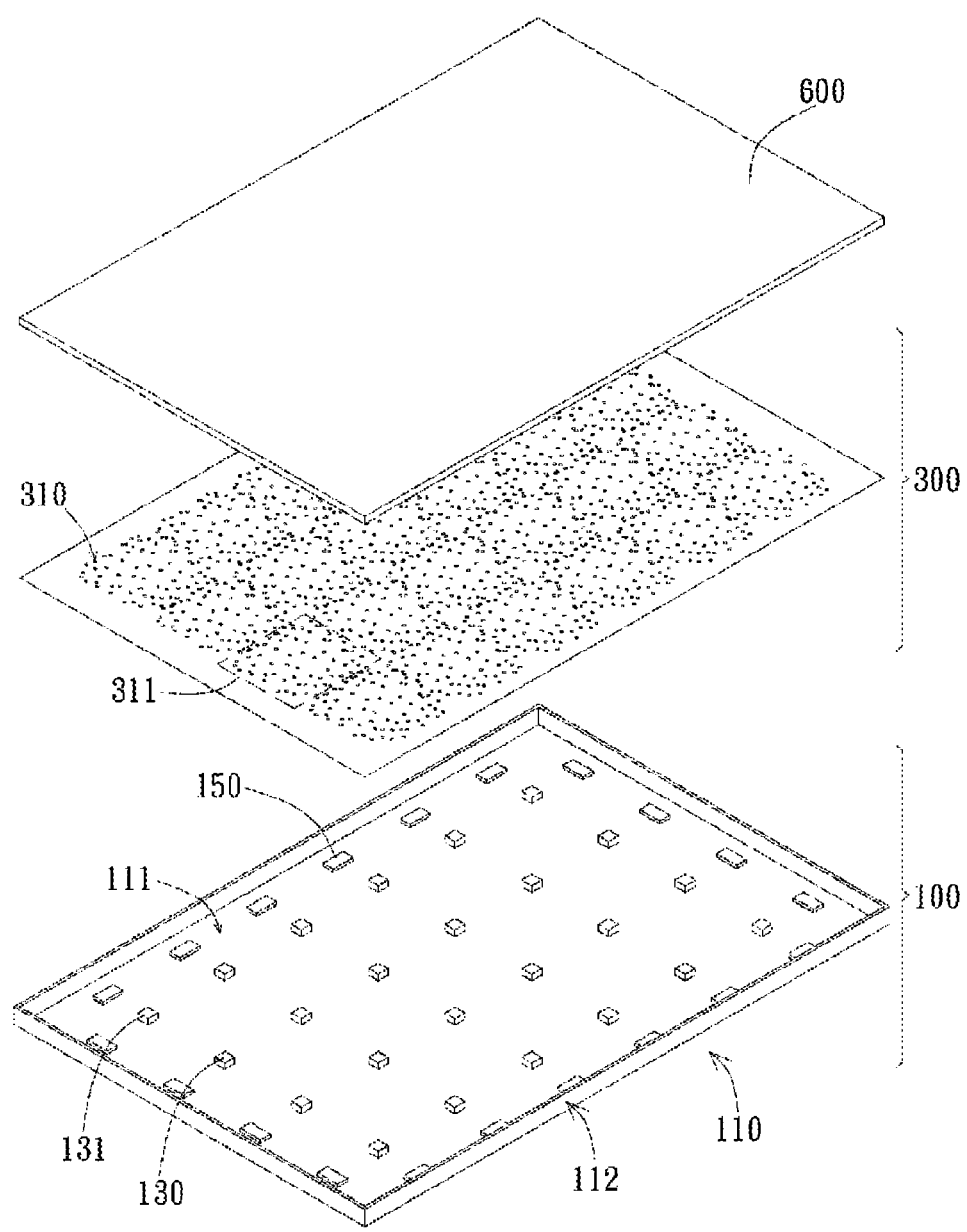
FIG. 2 schematically illustrates an exploded view of a backlight module according to an embodiment of the present invention.

As shown in FIG. 2, the backlight module includes a carrier plate 110, a plurality of light sources 130, at least one low reflective portion 150, and a modulation film 300. The carrier plate 110 has a carrier surface 111 carrying the light sources 130, and the carrier surface 111 has a first reflectance preferred between 50% and 100%. A preferred design is a reflective sheet made of polyethylene terephthalate (PET) containing the barium sulfate particles to construct the carrier surface 111. The carrier plate 110 is preferably made of metal, such as aluminum. However, in different embodiments, the carrier plate 110 may be made of plastic materials. The carrier surface 111 is preferably formed by the body surface of the carrier plate 110, but if the reflectance of the material of the carrier plate 110 is not enough, another reflective material can be disposed on the body surface of the carrier plate 110 to form the carrier surface 111 with the first reflectance.

Figure 3:
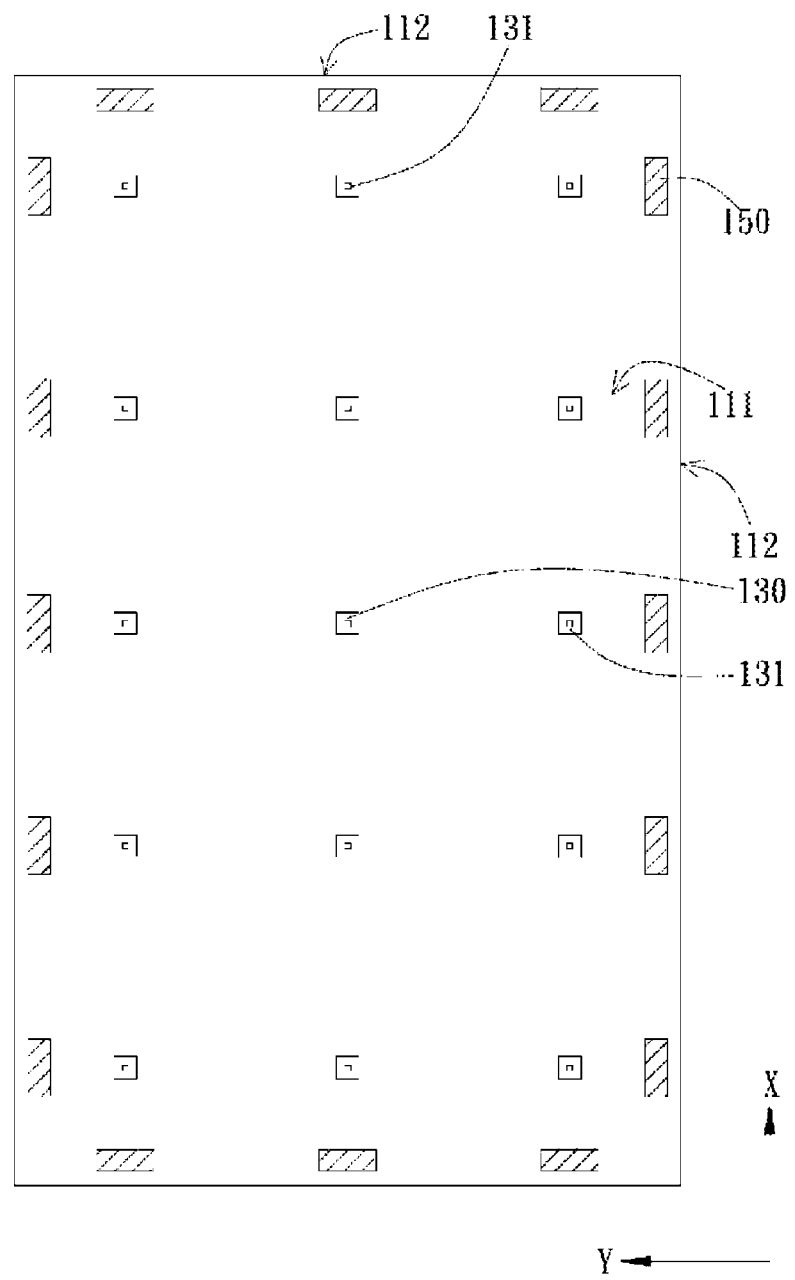
FIG. 3 schematically illustrates a carrier plate according to an embodiment of the present invention.

The light sources 130 are disposed on the carrier surface 111 and preferably disposed in a matrix. In the preferred embodiment, the light sources 130 include but not limited to LEDs. In addition, as shown in FIG. 2 and FIG. 3, the light sources 130 includes a plurality of outer light sources 131 disposed on the carrier surface 111 closest to the side edge 112 and arranged along the side edge 112. In the preferred embodiment, the carrier surface 111 is a rectangle having four side edges 112. Correspondingly, the outer light sources 131 are arranged in a frame shape, so that the outer light sources 131 surround the non-outer light sources 130 in the center area. In addition, the outer light sources 131 are preferably arranged linearly along the side edge 112.

As shown in FIG. 2 and FIG. 3, the low reflective portion 150 is formed on the carrier surface 111 and correspondingly between the outer light source 131 and the side edge 112. In the preferred embodiment, the low reflective portion 150 is disposed on the normal path of the side edge 112 through the outer light source 131, but is not limited thereto. The formation of the low reflective portion 150 includes but not limited to adding low-reflecting material to the carrier surface 111 or forming holes on the carrier surface 111 to reduce the light reflected from the corresponding position of the carrier surface 111. The low reflective portion 150 has a second reflectance, and the second reflectance is less than the first reflectance. In the preferred embodiment, when the low reflective portion 150 is made of dark materials or gum materials with low-reflectivity, such as rubber or polyethylene (PE) film, or made of ink with low-reflectivity, the second reflectance is not more than 60%. When the low reflective portion 150 is made of a material with the scattering effect, the second reflectance preferably may be greater than 60%, but the gloss rate of the low reflective portion 150 is not more than 30%.

Figure 4:
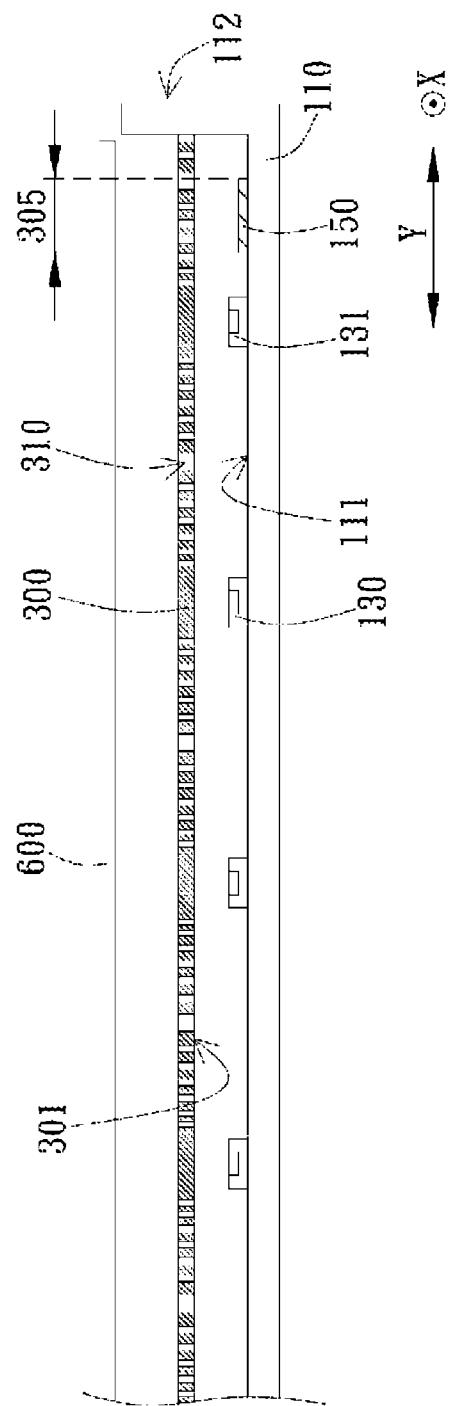
FIG. 4 schematically illustrates a cross-sectional view of a backlight module according to an embodiment of the present invention.

As shown in FIG. 2 and FIG. 4, the modulation film 300 is disposed above the light sources 130, i.e., disposed on one side corresponding to the light emitted by the light source 130. The light generated by the light sources 130 can be distributed by the modulation film 300 and emitted through different positions of the modulation film 300. In the preferred embodiment, a reflective surface 301 is formed on one side of the modulation film 300 facing toward the light source 130. The modulation film 300 includes the reflective surface and a plurality of light emitting structures 310, and the light emitting structures 310 may be through holes or non-through holes. In the embodiment as shown in FIG. 2, the light emitting structures 310 are preferably a combination of a plurality of blocks 311 respectively corresponding to the top of different light sources 130. The light generated by the light sources 130 can be reflected back and forth between the reflective surface 301 and the carrier surface 111 and emitted through the modulation film 300 via the light emitting structures 310. Thus, the normalized transmission ratio at different positions of the light emitting structures 310 can be changed by adjusting the density and the size at different positions on the modulation film 300 to distribute the light generated by the light sources 130. In addition, a diffusion plate 600 can be disposed above the modulation film 300 to further uniform the light emitted through the modulation film 300.

Figure 5:
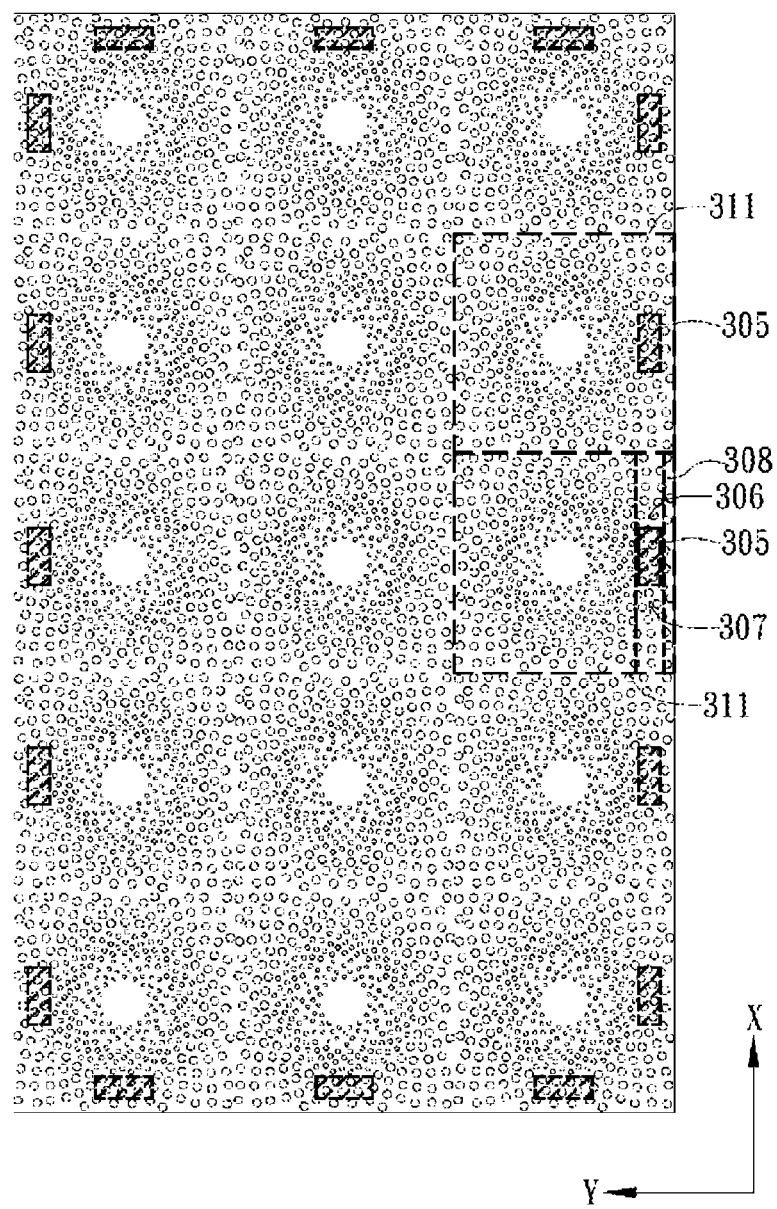
FIG. 5 schematically illustrates a modulation film according to an embodiment of the present invention.

As shown in FIG. 4 and FIG. 5, each low reflective portion 150 has a projection area 305 on the modulation film 300. In the direction X parallel to the extending direction of the side edge 112, the projection area 305 has a lower normalized transmission ratio comparing to adjacent areas, such as the areas 306 and 307. For a single block 311, if a band-shaped area 308 is designated based on the position of the projection area 305 along the direction X, the projection area 305 preferably has a lowest normalized transmission ratio in the band-shaped area 308. If the normalized transmission ratio at each position of the band-shaped area 308 along the direction X presents a curve distribution with peaks and valleys, the projection area 305 is preferably located in the valley position. In the preferred embodiment, the normalized transmission ratio refers to the area ratio of the light emitting structures 310 in a unit area. In other words, the normalized transmission ratio preferably is a standardized ratio value without the unit. However, in different embodiments, in addition to the area ratio of the light emitting structure 310, the characteristics of the light emitting structure 310 distributed at different positions also can be considered. For example, compared to the light emitting structure 310 with non-through holes, the light emitting structure 310 with through holes in the same area will have a higher transmission ratio.

Figure 6:
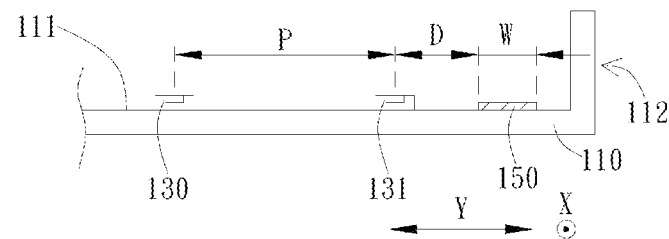
FIG. 6 schematically illustrates a cross-sectional view of a low reflective portion disposed according to an embodiment of the present invention.

The position having a lower normalized transmission ratio generally corresponds to the position receiving more light generated by the light sources 130, especially at a position near the side edge 112. With this design, the low reflective portion 150 can absorb part of the light, so that the light leakage generated at the position of the modulation film 300 corresponding to the low reflective portion 150 can be reduced. As shown in FIG. 6, in the direction Y perpendicular to the side edge 112, a pitch P is formed between the outer light source 131 and the nearest light source 130. In the direction Y, the distance D between the low reflective portion 150 and its corresponding outer light source 131 is preferably greater than one sixth of the pitch P (i.e. D>⅙P). In the preferred embodiment, the distance D is preferably a distance between the center of the outer light source 131 and the edge of the low reflective portion 150 toward the outer light source 131. However, in different embodiments, the distance D may be a distance between the center of the outer light source 131 and the center of the low reflective portion 150 in the direction Y. In addition, the width W of the low reflective portion 150 in the direction Y is preferably less than one third of the pitch P (i.e. W<⅓P). With this design, the overall uniformity of brightness can be increased, and the opportunity of insufficient brightness caused by excessive absorption of light of the low reflective portion 150 can be reduced.

Figure 7A:
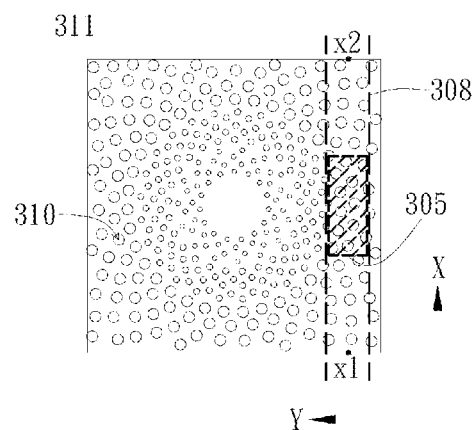
FIG. 7A schematically illustrates an outer block according to an embodiment of the present invention.
Figure 7B:
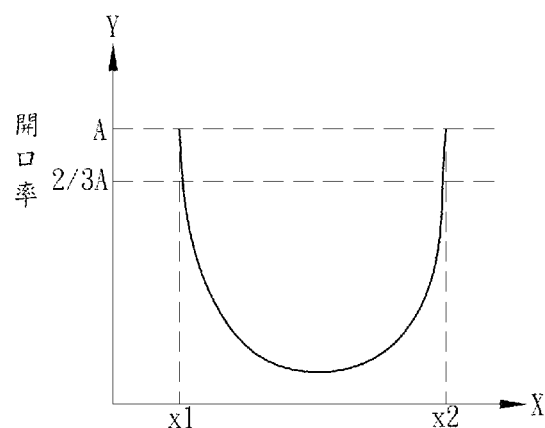
FIG. 7B schematically illustrates a distribution of normalized transmission ratio for various positions in a band-shaped area.

In another preferred embodiment, in the direction X parallel to the extending direction of the side edge 112, the normalized transmission ratio of the projection area 305 is not greater than two third of the largest normalized transmission ratio that the projection areas along the direction X will have. As shown in FIG. 7A, for a single block 311, a band-shaped area 308 can be designated based on the position of the projection area 305 along the direction X. if the largest normalized transmission ratio of the band-shaped area 308 at each position is A, and the projection area 305 has a normalized transmission ratio a, the preferred relationship corresponds to the formula:

$$a \leq \tfrac{2}{3} A$$

wherein the normalized transmission ratio a of the projection area 305 is preferably the normalized transmission ratio at different positions of the projection area 305, respectively. In other words, the normalized transmission ratio at each position of the projection area 305 is less than two third of the largest normalized transmission ratio A. If the normalized transmission ratio at each position of the band-shaped area 308 along the direction X presents a curve distribution, as shown in FIG. 7B, and the largest normalized transmission ratio A occurs at both ends $x_1$ and $x_2$ of the band-shaped area 308, then the both ends of the projection area 305 are respectively located at the position with a normalized transmission ratio of ⅔A. With this design, the width of the projection area 305 and the width of the low reflective portion 150 can be determined. However, in different embodiments, the normalized transmission ratio a of the projection area 305 may be an average normalized transmission ratio within the projection area 305, to match the characteristics of the curve distribution of different normalized transmission ratio. It should be noted, the band-shaped area 308 has a width in the direction Y perpendicular to the side edge 112; the present embodiment is based on the assumption that the width is extremely small in the direction Y. Firstly, the length in the direction X is determined, and then the width of the low reflective portion 150 in the direction Y is determined depending on the actual light leakage, the curve distribution of the normalized transmission ratio and the aforesaid width in the direction Y.

Figure 8A:
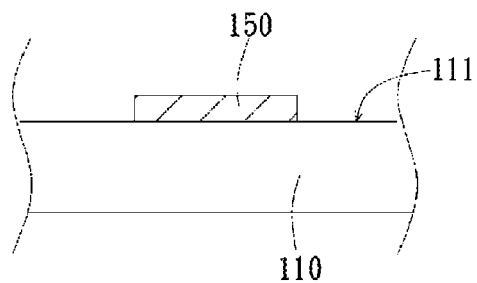
FIG. 8A schematically illustrates a cross-sectional view of a low reflective portion according to an embodiment of the present invention.
Figure 8B:
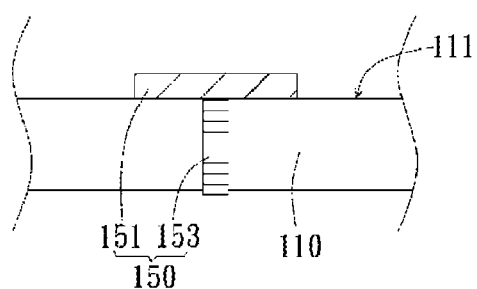
FIG. 8B schematically illustrates a cross-sectional view of a low reflective portion according to another embodiment of the present invention.

As shown in FIG. 8A, the low reflective portion 150 is a sheet-like structure attached to the carrier surface 111. In this embodiment, the low reflective portion 150 may be a dark or low reflectivity material, such as rubber or polyethylene (PE). In addition, the low reflective portion 150 may also be formed by ink dot printing. In the embodiment shown in FIG. 8B, the low reflective portion 150 may be a sheet member 151 secured onto the carrier surface 111. In other words, the low reflective portion 150 may be secured to the carrier surface 111 by a securing device 153, such as a screw or a rivet, extending downwardly from the sheet member 151 or attached to the sheet member 151.

Figure 9A:
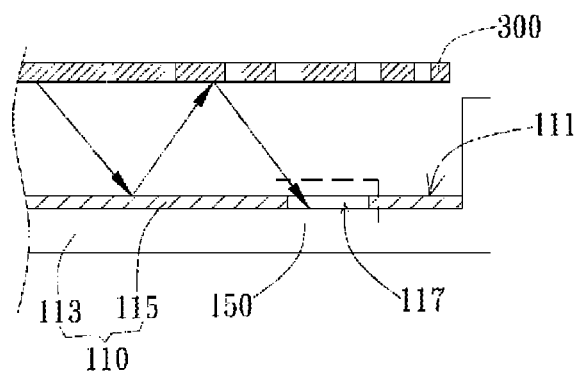
FIG. 9A schematically illustrates a light path for the low reflective portion absorbing light.

FIG. 9A is another embodiment of the backlight module. As shown in FIG. 9A, the carrier plate 110 is composed of the carrier body 113 and the reflective sheet 115. The reflective sheet 115 is disposed on the carrier body 113, and the surface of the reflective sheet 115 that faces away from the carrier body 113 forms aforesaid carrier surface 111. In this embodiment, the reflectance of the surface of the carrier body 113 that faces toward the reflective sheet 115 is less than the reflectance of the carrier surface 111 formed by the reflective sheet 115. As shown in FIG. 9A, at least one hole 117 is formed on the reflective sheet 115, wherein the hole 117 exposes the surface of the carrier body 113 that has a lower reflectance. With this design, the hole 117 and the exposed part of the carrier body 113 together form the low reflective portion 150 to absorb light. Compared to the foregoing embodiment, this embodiment only needs to form the hole on the reflective sheet 115 without additional steps of installing the reflective sheet 115, reducing the time and cost.

Figure 9B:
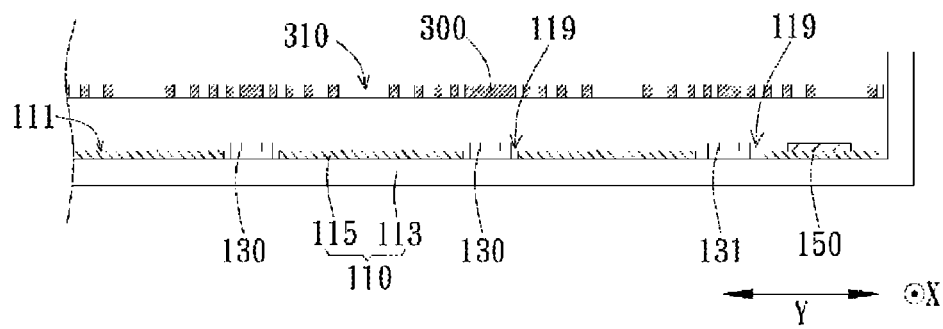
FIG. 9B schematically illustrates a cross-sectional view of a backlight module according to another embodiment of the present invention.

In the embodiment shown in FIG. 9B, the carrier plate 110 is similarly composed of the carrier body 113 and the reflective sheet 115, and a plurality of light source holes 119 are formed on the reflective sheet 115 to accommodate the light sources 130. The light sources 130 disposed in the light source holes 119 include, but are not limited to, the outer light sources 131; however, the light source holes 119 that accommodate the outer light sources 131 have an area larger than the light sources holes 119 that accommodate other light sources 130 so as to expose part of the carrier body 113.

In the preferred embodiment, the diameter of the light source hole 119 for accommodating the outer light source 131 is in a range of 1.5 to 4 times the diameter of the outer light sources 131, in order to provide a suitable light absorption ratio. With this design, the exposed part of the carrier body 113 is distributed around the outer light sources 131 and can absorb some of the light generated by the outer light sources 131. Thus, the brightness in a block can be reduced, further reducing the light leakage.

Figure 10A:
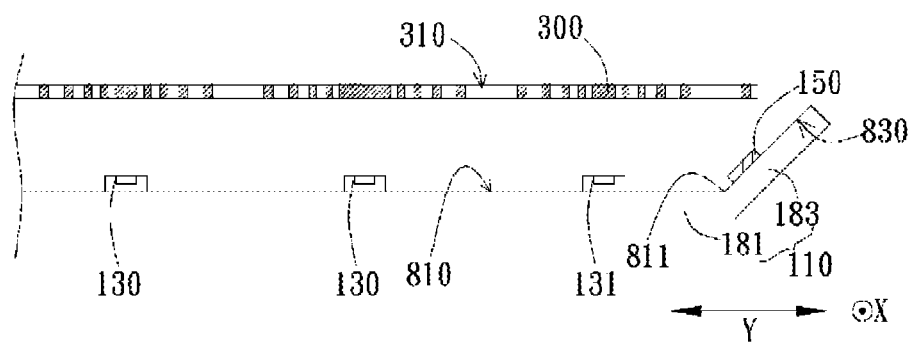
FIGS. 10A and 10B schematically illustrate the carrier plate having a bevel.
Figure 10B:
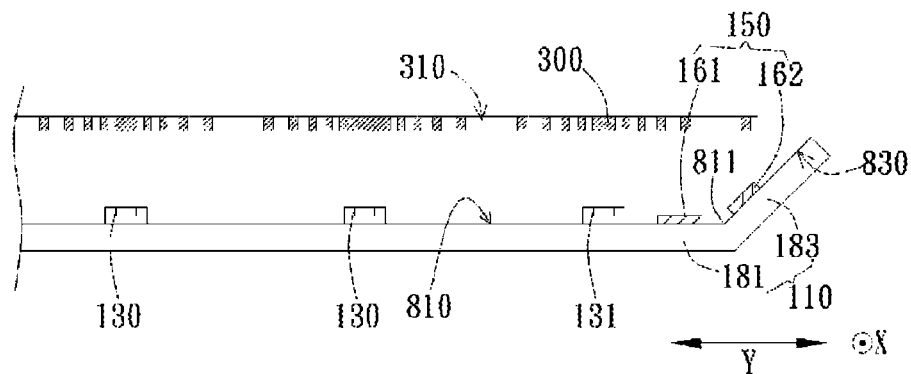

As shown in FIG. 10A, in another embodiment, the carrier plate 110 includes a bottom plate 181 with a plane and a sidewall 183 formed by bending the side edge of the bottom plate 181, and therefore the carrier surface 111 can be divided into a bottom area 810 corresponding to the bottom plate 181 and an inclined area 830 corresponding to the sidewall 183. The bottom area 810 has an end edge 811 and the end edge 811 is preferably parallel to the side edge 112. The outer light sources 131 disposed on the bottom area 810 and adjacent to the end edge 811. Preferably, the outer light sources 131 are distributed along the end edge 811 and closest to the end edge 811 among all the light sources 130. The inclined area 830 is inclined from the end edge 811 and extends outwardly toward the modulation film 300. In other words, the inclined area 830 relative to the bottom area 810 is bent toward the modulation film 300. In addition, the inclined area 830 is also distributed along the side edge 112. In this embodiment, as shown in FIG. 10A, the low reflective portion 150 is formed on the inclined area 830 to absorb some of the light generated by the outer light sources 131, and thereby the light leakage generated by the corresponding part of the modulation film 300 can be reduced. In yet another embodiment, as shown in FIG. 10B, the low reflective portion 150 can be divided into a first reflection area 161 and a second reflection area 162. The first reflection area 161 and the second reflection area 162 are formed on the bottom area 810 and the inclined area 830, respectively to provide a more uniform light emitting effect.

Figure 11:
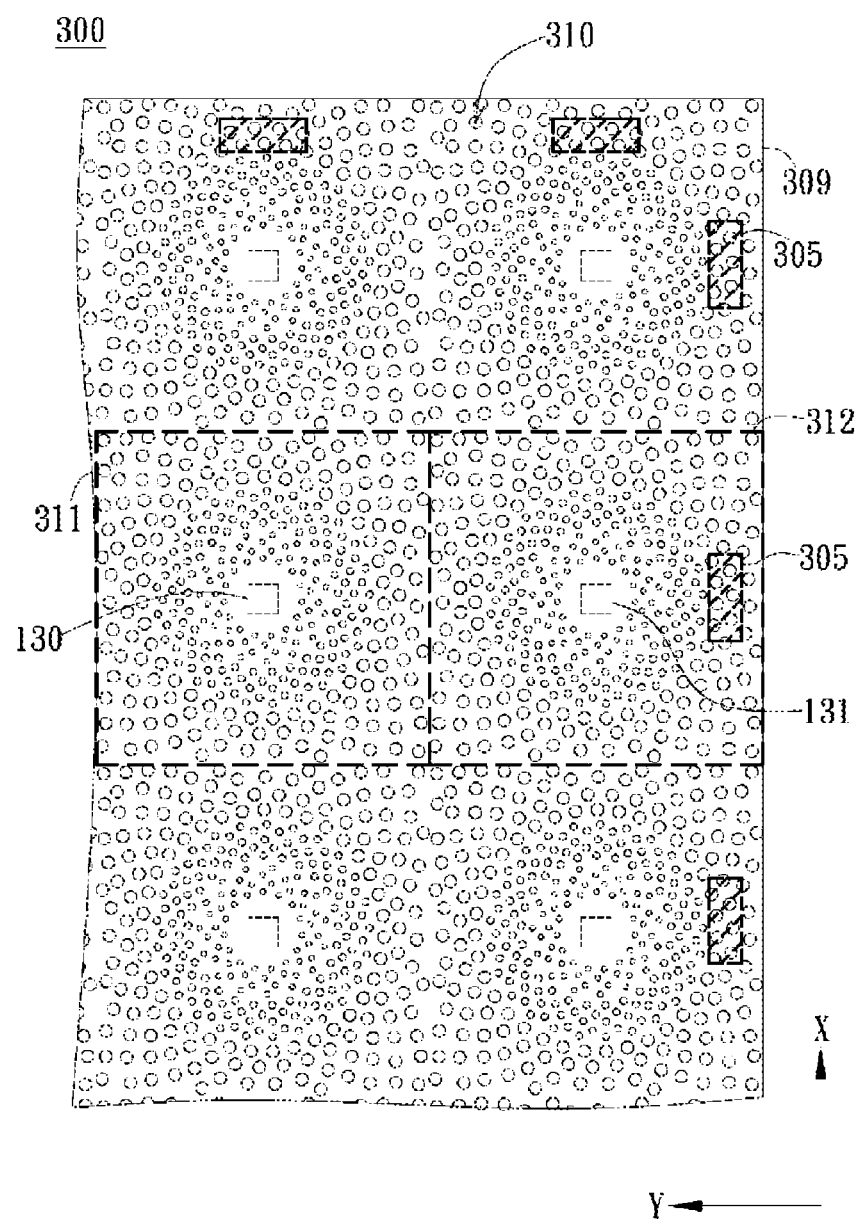
FIG. 11 schematically illustrates a modulation film according to an embodiment of the present invention.

FIG. 11 schematically illustrates a modulation film 300 according to an embodiment of the present invention. In this embodiment, the modulation film 300 includes a plurality of blocks 311 respectively corresponding to the light sources 130 including the outer light sources 131. In preferred embodiments, the light emitting structure 310 in the block 311 are distributed the same, similar or in a certain degree of correlation. The blocks 311 include a plurality of outer blocks 312 corresponding to the top of the outer light sources 131; the projection area 305 of the low reflective portion 150 within the outer block 312 is between a projection position of the corresponding outer light source 131 and the edge 309 of the modulation film 300 parallel to the side edge 112. In the outer block 312, the normalized transmission ratio of the light emitting structure 310 is based on the projection position corresponding to the light source 131 as the center and increases progressively toward the outer side of the outer block 312 based on a function value of a default function. In other words, the function value of the default function will increase with an increasing distance from the projection position of the light source. The default function preferably is a polynomial function, such as quadratic or cubic polynomial function, but is not limited thereto. The default function is a quadratic polynomial function; for example, the default function can be:

$$f(x)=ax^2+bx+c$$

wherein x is a distance of each position of the outer block 312 distant from the projection area of the light source, and f(x) can be a normalized transmission ratio of the position or the foregoing normalized transmission ratio multiplied by a parameter. With this design, a more uniform backlight will be obtained.

Figure 12:
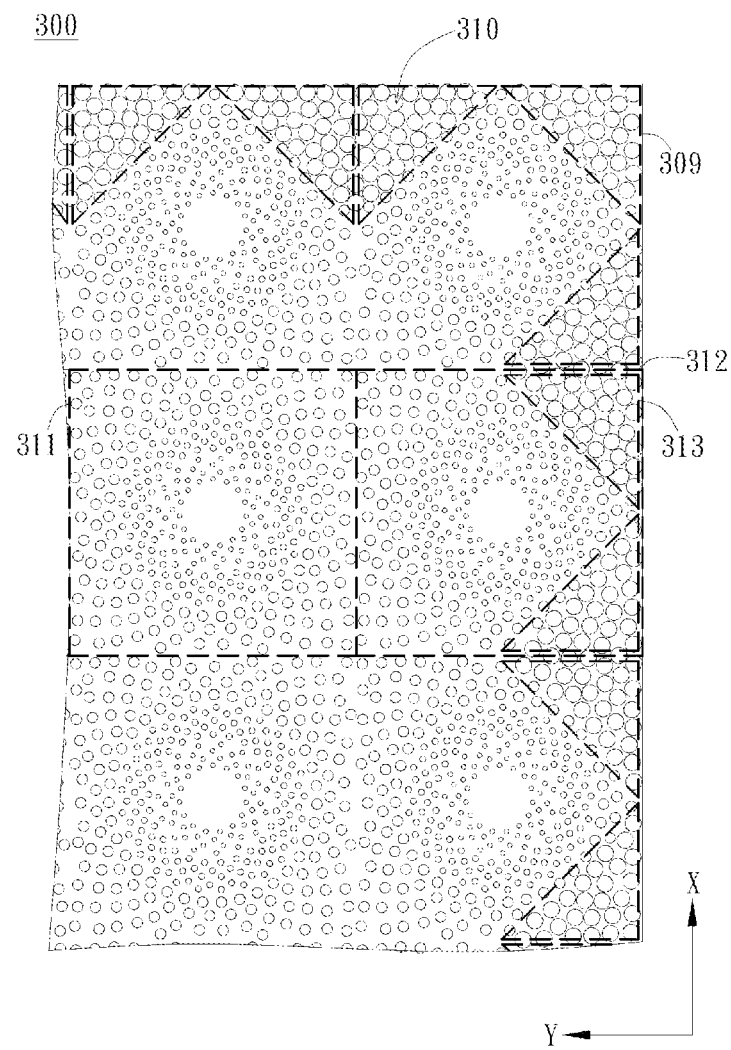
FIG. 12 schematically illustrates a modulation film having a preset area according to an embodiment of the present invention.

In another embodiment shown in FIG. 12, the outer block 312 includes a preset area 313 adjacent to the outer block 312 and the edge 309, respectively. In this preferred embodiment, the preset area 313 is the two corner areas located on one side of the outer block 312 adjacent to the edge 309. Thus, the outer block 312 will has a preset area 313 adjacent to another preset area 313 of the another adjacent outer block 312 and together form an isosceles triangle with an apex angle toward the inner side of the modulation film 300. In addition, the preset area 313 also can be formed as a corner area with an isosceles triangle shape. As shown in FIG. 12, if the corner area of the preset area 313 is formed as an isosceles triangle, the length of the isosceles side is preferably less than half the edge 309. However, in different embodiments, the preset area 313 is not limited to the corner area, triangle, or isosceles triangle. The preset area 313 can have other geometry shapes.

In the preset area 313, the normalized transmission ratio of the light emitting structure 310 is different from that of other areas, preferably higher than other areas. In preferred embodiments, the normalized transmission ratio of the preset area 313 is based on the projection position corresponding to the light source as the center and increases progressively toward the outer side of the outer block 312 based on a function value of a default function multiplied by a weighting value, wherein the weighting value is between 1.1 to 1.3. With this design, the amount of light emitting in the area of the outer block 312 where the dark band is likely generated can be increased effectively to improve the light emitting uniformity.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module, comprising:
   a carrier plate having a carrier surface, the carrier surface having a first reflectance;
   a plurality of light sources disposed on the carrier plate and surrounded by part of the carrier surface, the light sources including a plurality of outer light sources distributed along a side edge of the carrier surface;
   a plurality of low reflective portions formed on the carrier surface, the plurality of low reflective portions respectively correspondingly disposed between the outer light sources and the side edge of the carrier plate, wherein the low reflective portions have a second reflectance less than the first reflectance; and
   a modulation film disposed above the light sources and having a plurality of light emitting structures, the modulation film distributing light generated by the light sources to emit the light through the light emitting structures at different positions,
   wherein each of the low reflective portions has a projection area on the modulation film, and in a direction parallel to an extending direction of the side edge of the carrier plate, the projection area has a lower normalized transmission ratio compared to adjacent areas; and
   wherein the carrier surface comprises:
   a bottom area having an end edge, wherein the outer light sources are disposed on the bottom area and adjacent to the end edge; and
   an inclined area inclined from the end edge and extending outwardly toward the modulation film, wherein the inclined area is distributed along the side edge;
   wherein at least part of the low reflective portion is formed on the inclined area.

2. The backlight module of claim 1, wherein a pitch exists in a direction perpendicular to the side edge between the outer light source and its nearest light source, and a distance between the low reflective portion and its corresponding outer light source is greater than one sixth of the pitch.

3. The backlight module of claim 1, wherein a pitch exists in a direction perpendicular to the side edge between the outer light source and its nearest light source, and a width of the low reflective portion in the direction perpendicular to the side edge is less than one third of the pitch.

4. The backlight module of claim 2, wherein in the direction parallel to the extending direction of the side edge, the normalized transmission ratio of the projection area is not greater than two third of the largest normalized transmission ratio of the projection areas along the direction parallel to the extending direction of the side edge.

5. The backlight module of claim 1, wherein the second reflectance is not greater than 60%.

6. The backlight module of claim 1, wherein the second reflectance is not greater than 60%, and the gloss rate of the low reflective portion is not greater than 30%.

7. The backlight module of claim 1,
   wherein the low reflective portion includes a first reflection area and a second reflection area, the first reflection area is formed on the bottom area and the second reflection area is formed on the inclined area.

8. The backlight module of claim 1, wherein the carrier plate comprises:
   a carrier body; and
   a reflective sheet disposed on the carrier body, wherein the reflectance of a surface of the reflective sheet facing away from the carrier body is greater than the reflectance of the carrier body,
   wherein a plurality of holes are formed on the carrier body to expose part of the carrier body, the holes and the exposed part of the carrier body together form the low reflective portion.

9. The backlight module of claim 1, wherein carrier plate comprises:
   a carrier body; and
   a reflective sheet disposed on the carrier body, wherein the reflectance of a surface of the reflective sheet facing away from the carrier body is greater than the reflectance of the carrier body,
   wherein a plurality of light source holes are formed on the reflective sheet to accommodate the light sources, the light source holes accommodating the outer light sources have an area larger than the light source holes accommodating the other light sources to expose part of the carrier body.

10. The backlight module of claim 1, wherein the modulation film has a plurality of blocks respectively corresponding to the light sources, the blocks include a plurality of outer blocks above the outer light sources and located at the outermost of the modulation film, the normalized transmission ratio of the light emitting structures in at least one of the outer blocks is based on the projection position corresponding to the outer light source as the center and increases progressively toward the outer side of the outer block based on a function value of a polynomial function.

11. The backlight module of claim 10, wherein at least one of the outer blocks includes a preset area adjacent to the edge of the modulation film and the adjacent outer block, the normalized transmission ratio of the preset area is based on the projection position of the closest outer light source as the center and changes based on the function value of the polynomial function multiplied by a weighting value, wherein the weighting value is between 1.1 to 1.3.

12. The backlight module of claim 11, wherein the preset areas of adjacent outer blocks together form an isosceles triangle with an apex angle toward the inner side of the modulation film.

13. A backlight module, comprising:
a carrier plate having a carrier surface with a first reflectance;
a plurality of light sources disposed on the carrier plate and surrounded by part of the carrier surface, the light sources including a plurality of outer light sources distributed along a side edge of the carrier surface;
a modulation film disposed above the light sources and having a plurality of light emitting structures, wherein the modulation film has a plurality of blocks respectively corresponding to the light sources, the blocks include a plurality of outer blocks above the outer light sources and located at the outermost of the modulation film, a normalized transmission ratio of the light emitting structures in the outer block is based on a projection position corresponding to the light source as the center and increases progressively toward the outer side of the outer block based on a function value of a polynomial function; and a plurality of low reflective portions formed on the carrier surface and below the outer blocks, the low reflective portions have a second reflectance less than the first reflectance;
wherein each of the low reflective portions has a projection area within the outer blocks respectively, the projection area is between a projection position of the outer light source in the outer block and an edge of the modulation film parallel to the side edge; and
wherein the carrier surface comprises:
a bottom area having an end edge, wherein the outer light sources are disposed on the bottom area and adjacent to the end edge; and
an inclined area inclined from the end edge and extending outwardly toward the modulation film, wherein the inclined area is distributed along the side edge;
wherein at least part of the low reflective portion is formed on the inclined area.

14. The backlight module of claim 13, wherein at least one of the outer blocks includes a preset area adjacent to the adjacent outer block and the edge of the modulation film, the normalized transmission ratio of the preset area is based on the projection position of the closest outer light source as the center and changes based on the function value of the polynomial function multiplied by a weighting value, wherein the weighting value is between 1.1 to 1.3.

15. The backlight module of claim 14, wherein the preset areas of adjacent outer blocks together form an isosceles triangle with an apex angle toward the inner side of the modulation film.

* * * * *